United States Patent [19]

Gosman

[11] 4,173,715

[45] Nov. 6, 1979

[54] ACOUSTICAL DEVICE

[76] Inventor: Theodore D. Gosman, 9 Warner Ct., Huntington, N.Y. 11743

[21] Appl. No.: 869,175

[22] Filed: Jan. 13, 1978

[51] Int. Cl.[2] .......................... H04M 1/05; H04R 5/00

[52] U.S. Cl. ............................ 179/156 R; 179/1 GQ; 181/129

[58] Field of Search .......................... 181/20, 129–137; 179/1 GP, 1 GQ, 102 E, 156 R, 107 FD, 1 E, 182 R; 2/209

[56] References Cited

U.S. PATENT DOCUMENTS

| | | | |
|---|---|---|---|
| 3,098,307 | 7/1963 | Caldwell, Jr. | 181/20 |
| 3,702,123 | 11/1972 | Macken et al. | 179/107 FD |
| 3,863,028 | 1/1975 | Fixler | 179/1 GQ |
| 3,891,810 | 6/1975 | Hayashi | 179/156 R |
| 3,939,310 | 2/1976 | Hodges | 179/156 R |
| 4,110,583 | 8/1978 | Lepper | 179/156 R |

FOREIGN PATENT DOCUMENTS

| | | | |
|---|---|---|---|
| 2608908 | 9/1977 | Fed. Rep. of Germany | 179/156 R |

*Primary Examiner*—L. T. Hix
*Assistant Examiner*—Benjamin R. Fuller
*Attorney, Agent, or Firm*—Kirschstein, Kirschstein, Ottinger & Cobrin

[57] ABSTRACT

An acoustical device for the reception of sound such as music by humans. The device includes a stereo headset having an acoustic passage and terminal earphones at each end of the headset. The headset is mountable on the head of a human so that the terminal earphone at each end of the headset is disposable over an ear of a human. The acoustic passage is hollow and extends from one side of the headset to the other, so that sound emanating from one terminal earphone is channeled from one ear of a human to the other ear, and so that sound emanating from the other terminal earphone is channeled from the other ear of a human to the one ear. Mechanical sound inhibitors are provided. A first inhibitor is disposed in the acoustic passage, so that various ratios of direct sound to ambient sound reflected through the acoustic passage may be mixed and received in an ear of a human as a mixed sound. A second inhibitor is disposed in each end of the headset within each of the terminal earphones, so that sound emanating from the terminal earphones may be varied in amplitude. A sound emitting element is preferably disposed centrally in the acoustic passage.

22 Claims, 20 Drawing Figures

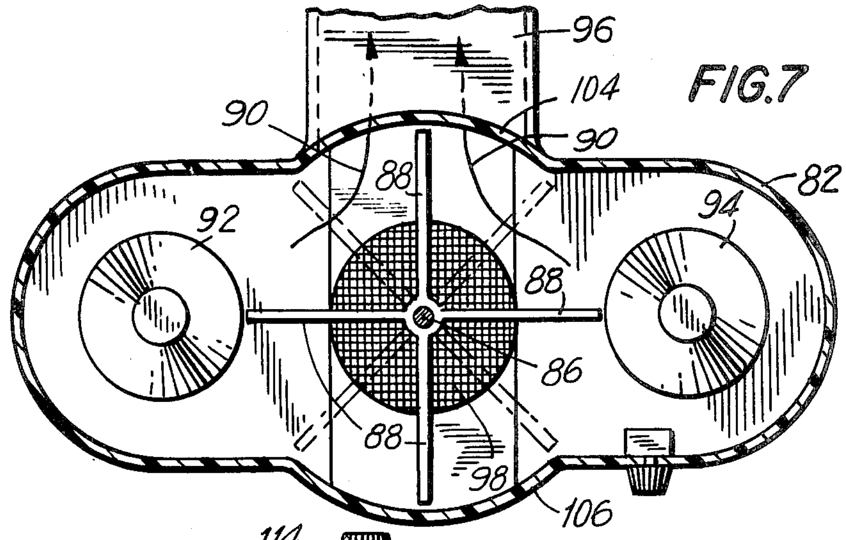
FIG.7
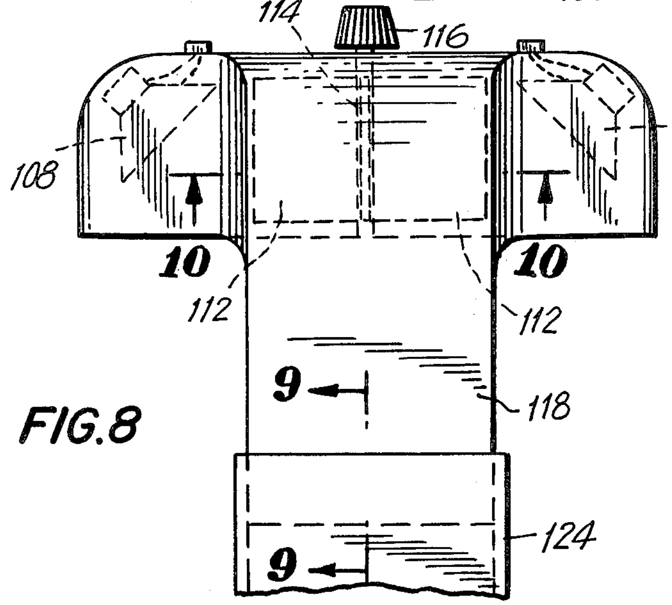
FIG.8
FIG.9
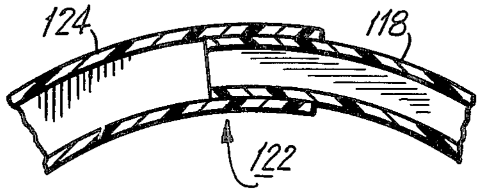
FIG.10
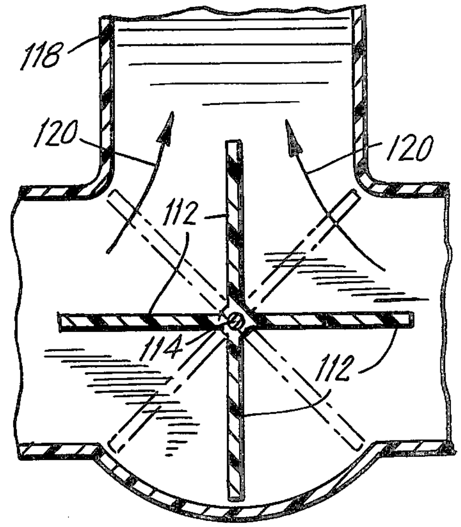

FIG. 11
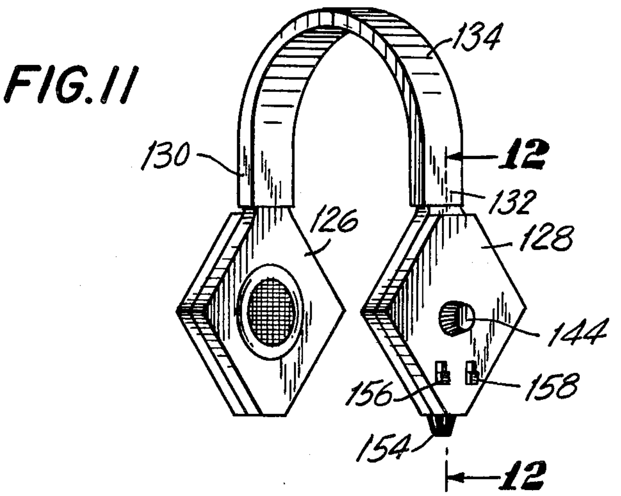
FIG. 12
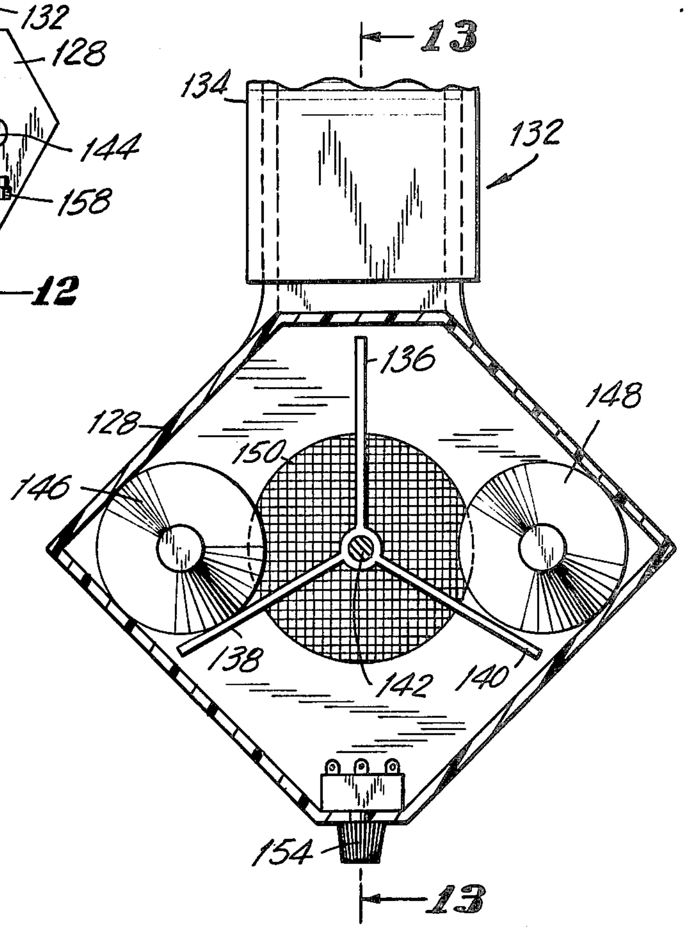
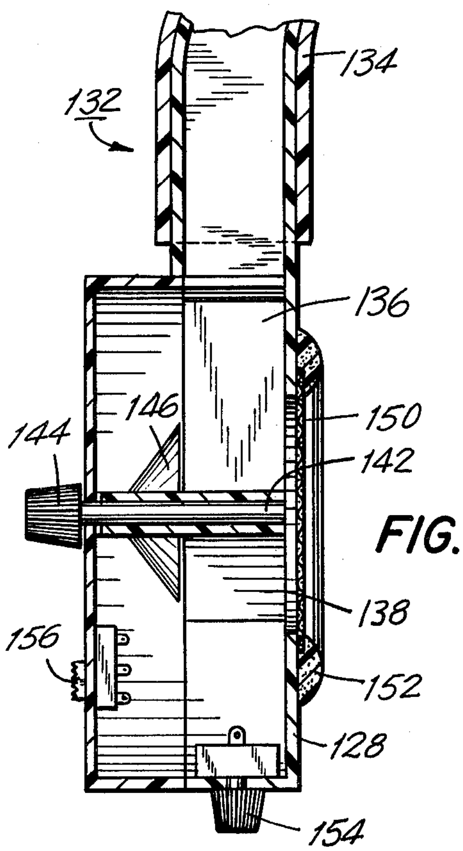
FIG. 13

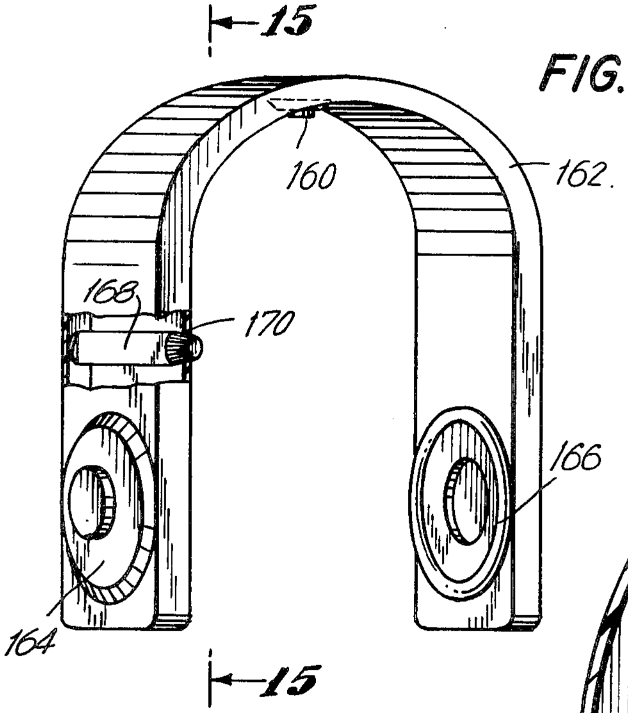
FIG. 14
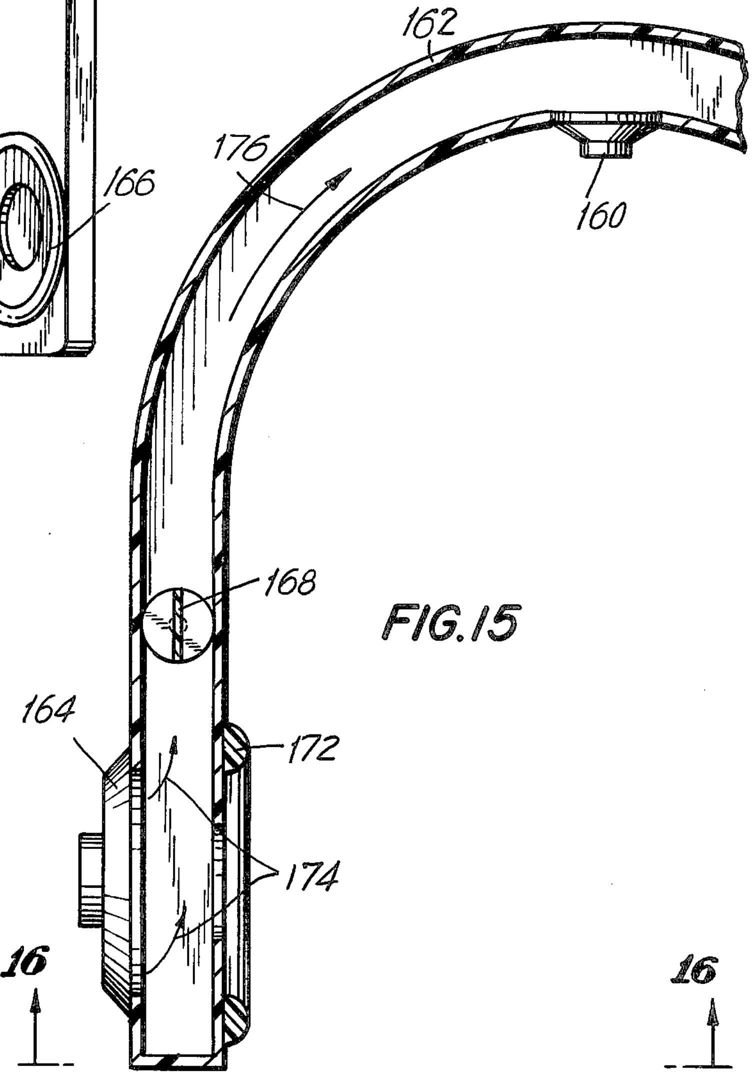
FIG. 15
FIG. 16
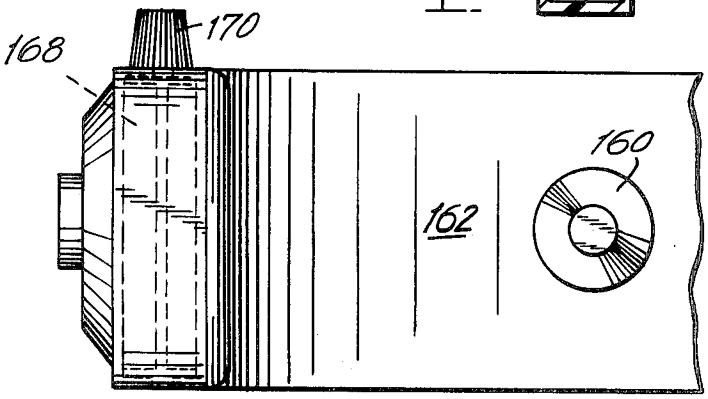

FIG. 17
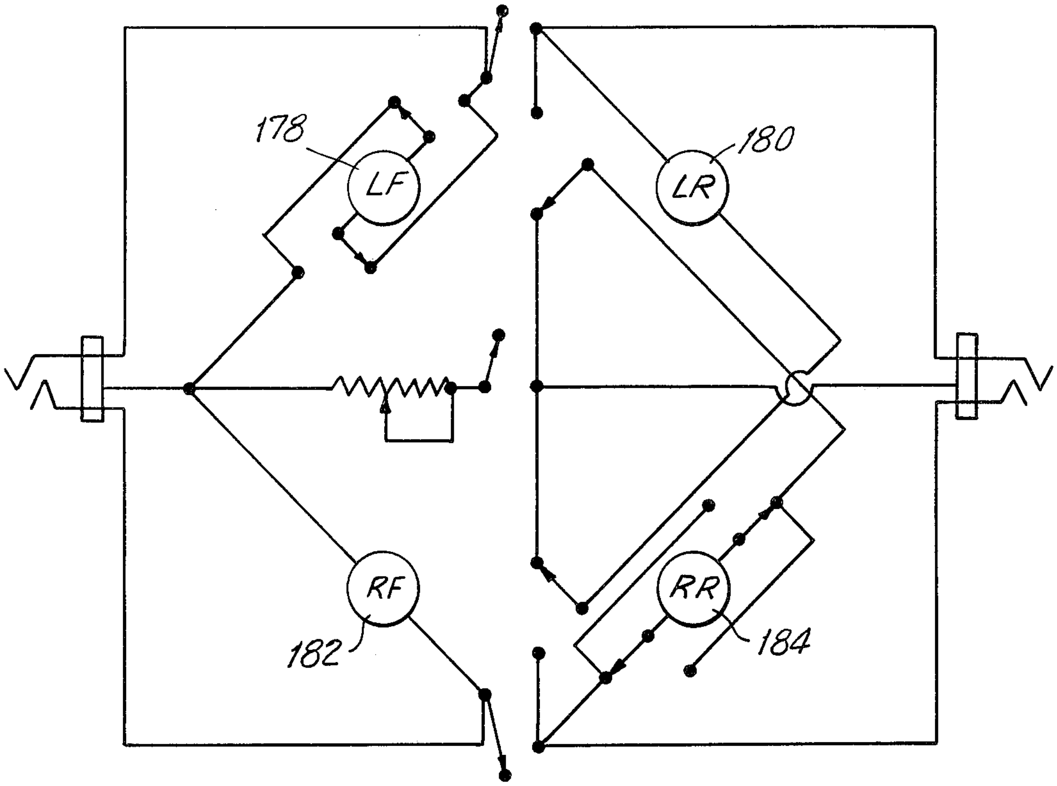
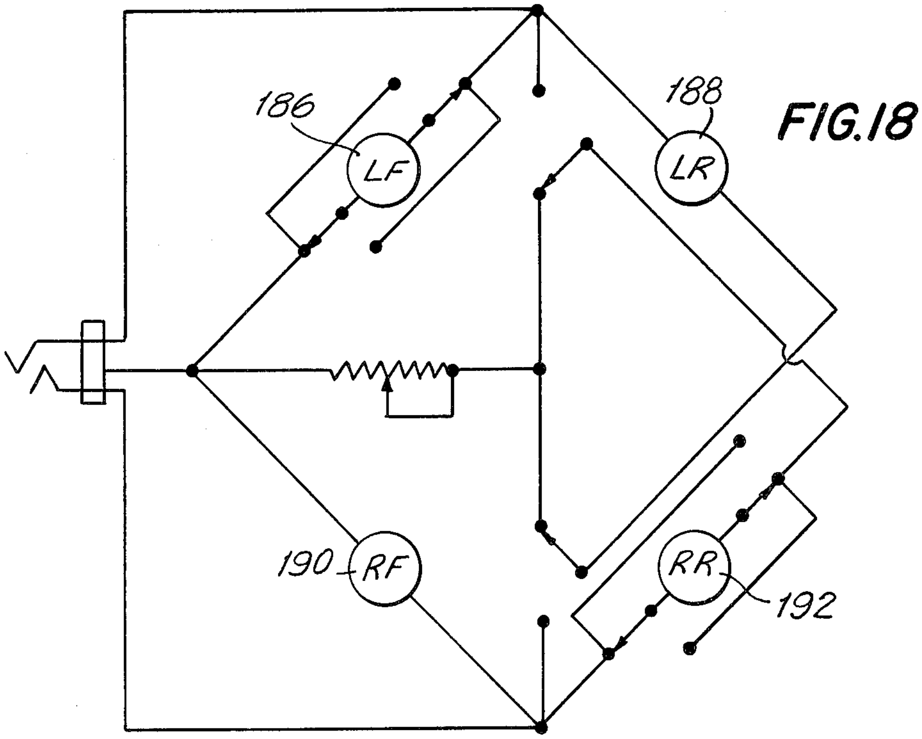
FIG. 18

FIG. 19
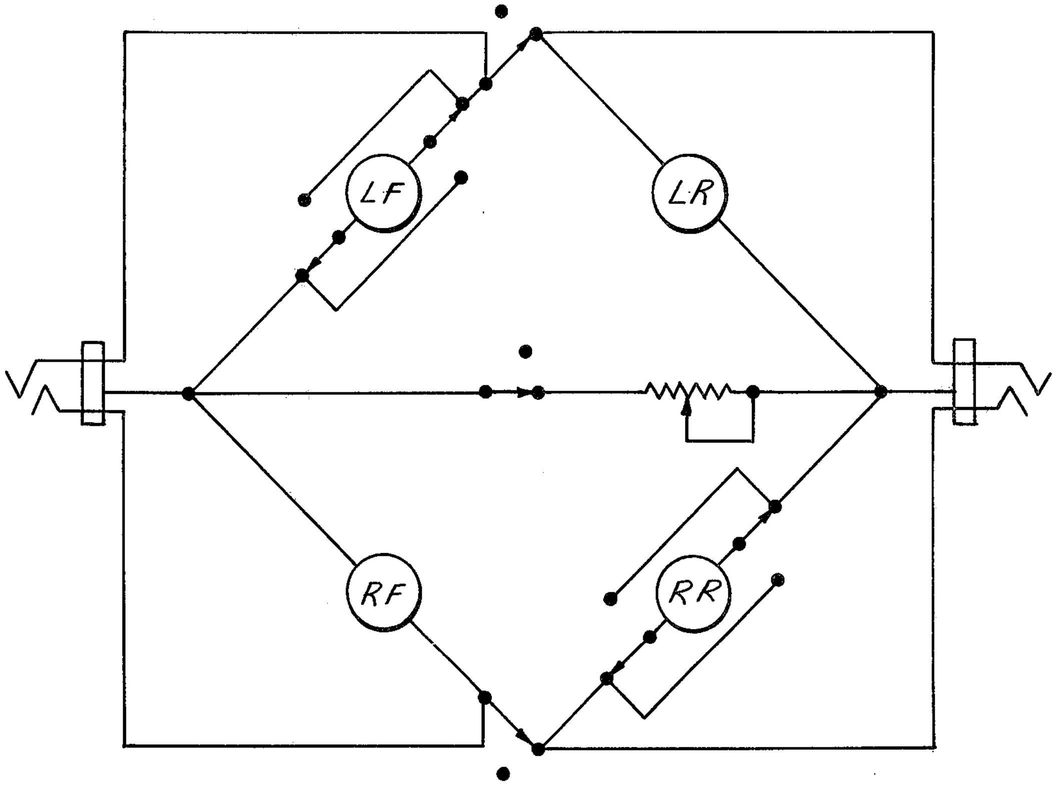
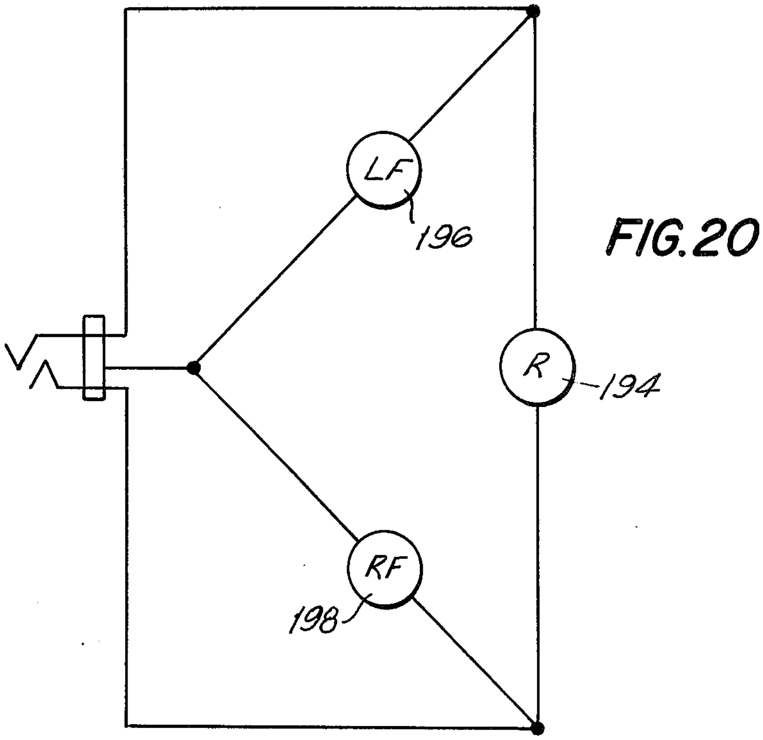
FIG. 20

ACOUSTICAL DEVICE

BACKGROUND OF THE INVENTION

1. Field of the Invention

The invention relates to an acoustical device for the reception of sound by humans.

2. Description of the Prior Art

In some prior art headphone and earphone designs, it is necessary to employ either electrical or acoustical means to attain approximate reproduction of sound. An acoustic passage for the acoustical channeling of sound from one ear to the opposite ear is described in U.S. Pat. No. 3,939,310. Other prior art relative to stereophonic reception of sound by means of headphones or earphones includes U.S. Pat. Nos. 3,924,072; 3,863,028; 3,792,754; 3,098,307 and Re 25,652.

In our everyday life of listening to sounds, several things which we take for granted, enable us to locate and detect via ears and brain what takes place around us by way of sound. One consideration is binaural localization. We are able to determine, to a fair degree of precision, sound direction and often estimate even distance of sound sources. There are several factors which determine direction of arrival by sounds. One is intensity of arrival at our ears. Another is the time of arrival of the sound versus path length to our ears. Another is diffraction of sound waves around the head, resulting in intensity and phase changes, the head being a fraction of wavelength at low frequency levels and increasing in size to wavelength multiples at higher frequencies. Another is that at high frequencies, the head acts as a shadow area, and intensity in the direction of the ear towards the source is greater than the ear in the shadow area. For frequencies above about 1200 hertz (cycles per second), the sound shadow cast by the ear lobes is enough to allow the ears to distinguish sounds arriving in front or behind the listener. Finally, binaural localization of a sound source depends on the ability of the ear to detect differences in time of arrival of sound waves at the ears. Lacking this ability of the ears to detect this difference, results in the sound appearing to come from the median plane of the head, i.e., apparently emanating from the center and inside the head of the listener. In stereo listening, this effectively allows the center channel to be monaural.

Commercially available stereophonically recorded program materials include two completely separate channels of program information which are formed, for example, by combining recorded signals from microphones disposed at many locations in the recording studio. When reproduced by a pair of loudspeakers located in a room, such stereophonic program material provides not only directionality, but also, because the sound from each loudspeaker reaches both ears of the listener, either directly or after being reflected from surfaces in the room, the left and right channels are mixed before they reach the listener's ears to provide a panorama of sound.

The manner in which the sound from each loudspeaker mixes with that of the other before reaching the ear of the listener depends upon numerous factors. For example, the position of the listener with respect to the loudspeakers, the frequency of the program material, and the size, shape and contents of the room in which the loudspeakers and listeners are located all contribute to this mixing process. The mixing is not, therefore, merely the addition of a portion of one channel to the other, but instead, involves the complex addition of phase-shifted sounds. A similar mixing process occurs if the listener hears the program material live as it is being recorded, and it is this mixing process which provides true "binaural" listening.

A preponderance of commercially available stereophonically recorded program materials presume that some mixing of the left and right channels will occur when played back through loudspeakers. However, when reproduced through headphones, this complex mixing of the left and right channels does not occur, and instead, the program material in the left channel is coupled directly to the left ear of the listener and the program material of the right channel is coupled directly to the right ear. Although the resulting complete separation of the left and right channels provides a most pleasing listening experience, a "panorama" of sound is difficult to achieve with some recorded materials. For example, when listening to a vocalist accompanied by an orchestra, the vocalist may appear in the center, the brass on the right and the strings on the left. Rather than a continuous blending of these three apparent sources of sound, however, gaps may appear between them. The extent to which this effect is noticed varies greatly depending on the nature of the program material, the type of recording technique used, and the sensitivities of the individual listener.

In the prior art, an old device was devised wherein a pair of spring connected ear pieces with no electrical activity were provided with a flexible tube running between the two ear pieces. The device was intended to be used by abutting one ear piece against a telephone receiver whereby extraneous sounds other than from the telephone receiver were shut out and the sounds were transmitted to the abutting ear piece and from the abutting ear piece to the other ear piece by means of the flexible tube. However, in this old device, the ear pieces had no electrical activity of any kind, to say nothing of not having stereophonic speakers as in the instant invention. Also, instead of having a substantially large acoustical passageway between the wearers' ears as the instant invention does, the passive ear piece merely used a relatively small diameter flexible tube.

Headsets have also been used wherein a tube connected both earphones and also passed in front of the wearer's mouth. The tube had a sound entrance opening in the tube in front of the wearer's mouth and the purpose of the tube is to convey sounds from the wearer's mouth to the wearer's ears so the wearer of the headset can hear himself talk.

The headset was not a stereophonic headset and instead of having a large acoustical passageway between the headset wearer's stereophonic speakers and ears a relatively small diameter tube with a mouth sound entrance opening was used. The purpose of the headset and tube was not to listen to stereophonic sounds, the purpose of the tube being merely to convey the wearer's speech to the wearer's ears.

To more fully appreciate the addition of this invention to the arts a brief discussion of stereophonic sound and this invention follows.

Stereophonic headsets existing today are alike in one important aspect. All transduce the electric signal from the left channel of a stereophonic sound recording or radio source to the left ear only, and the right channel to the right ear only, in the form of compressional sound waves. Although there is a pronounced stereo effect to the listener, that is, different sounds seem to come from different directions, the sound received by the listener is still not as realistic, when compared with the sound from a "live" program, as is possible with my invention.

An examination of how sound from a live program is received at the ears of a listener will make apparent the reason for the lack of realism in the prior apparatuses mentioned above. This invention overcomes the lack of realism and more closely approximates the effect of "live" sound at the ears of the listener. Upon hearing directional sound, that is, sound which is radiated from different distinct sources, the human brain "uses" three components of the sound received to deduce direction, distance and spatial quality. Those three components are (1) intensity differences between the sound at the two ears, (2) the phase difference of the sound wave compared between the two ears (the difference in time of arrival of a sound wave between the two ears) and (3) reflection-reverberation patterns due to the boundaries of the listening environment (all of which is familiar to those skilled in acoustic arts). As an example of a phase shift, at a frequency in the middle of the audible range, about 1,000 Hz, the wavelength of sound is about 13.5 inches. If a sound at this frequency arrives at a listener from directly in front of him, the wave arrives at both ears at the same time, in the same phase, and with the same intensity, since the wave has traversed an equal distance to each ear. But if the wave originates from a direction 45° to the left of center, the wave will arrive at the left ear first, and after a slight bend around the head, it arrives at the right ear about one-half a wavelength later than the left ear, and therefore out of phase compared to the left ear. Due to the direct obstruction of the head in the wave front, the wave must spread around the head, causing both the phase lag and an intensity drop between the ears of the listener. At lower and higher frequencies, the same event occurs, but the phase lag and intensity drop for low frequencies are lessened due to the nature of the longer wavelength. At higher frequencies, the phase lag between the ears may be several frequency periods and the intensity drop quite considerable, due to the nature of the shorter wavelengths. In addition, the reflection of the sound off the walls or boundaries of the environment presents both ears of the listener with an additional complex and delayed system of waves in terms of intensity and phase relations. Due to the sensitivity of the ears and the capability of the brain, the listener deduces the intensity and phase differences of the initial transient sound waves in combination with reflection and reverbation to form an accurate mental cognition of the direction, distance and spatial quality of actual live sound.

It is obvious that all prior stereophonic headsets, due to the restriction of directing all the transduced sound from one sound radiator to one ear only, and all the sound from the other sound radiator to the other ear only, cannot simulate for the ears of the listener the quality of live, spatial sound, because the phase differences and reflection-reverberation patterns that are necessary are not present.

SUMMARY OF THE INVENTION

1. Purposes of the Invention

It is an object of the present invention to provide an improved acoustical device for the reception of sound by humans.

Another object is to provide an acoustical device in which a combination of electrical and acoustical features greatly enhance the art of headphone design and listening.

A further object is to provide an acoustical device with enhanced stereophonic reproduction.

An additional object is to provide an acoustical device with enhanced quadrophonic reproduction.

Still another object is to provide an acoustical device which eliminates masking effects.

Still a further object is to provide an acoustical device which restores reverberation components by phasing controls.

An object is to provide an acoustical device having selectivity of localization and direction.

An object is to provide an acoustical device which has control of phase and harmonic content by acoustic and electrical means.

An object is to provide an acoustical device having greater control of ambience spread (panorama) with controls and acoustic channel.

An object is to provide an acoustical device which accomplishes restoration of binaural localization (combining beat tones).

An object is to provide an acoustical device having delay time differential (localization).

An object is to provide an acoustical device having discrete quadraphonic as well as enhanced stereo.

An object is to provide an acoustic device having attenuation of impulse static and record noise.

An object is to provide an acoustic device in which combination tones are restored.

An object is to provide an acoustic device having improved transient response and timbre.

An object is to provide an acoustic device in which the "middle of the head" effect is eliminated.

These and other objects and advantages of the present invention will become evident from the description which follows.

2. Brief Description of the Invention

The present invention uses a combination of both electrical and acoustical features which greatly enhance the art of headphone design and listening. The device is based on the utilization of an acoustic passage between the earphones of the headset. This passage performs the acoustical function of channeling sound from one ear to the opposite ear and vice versa. The acoustic passage is a method and device for simulating, as per normal acuity, in the hearing process in real life situations, utilizing the normal diffraction path across the head. Partials and harmonics tend to be reinforced by this method. Ambience is restored simulating actual concert hall reverberation and binaural localization. Phase and time delays are restored to both ears, which is necessary in comparing two sources of sound in perception of direction.

Thus, the present invention incorporates an acoustical passageway around the head, which allows the sound waves produced at one sound radiator to be heard not only by the ear adjacent to that sound radiator, but also by the other ear. For example, sound produced by the left sound radiator is first heard as a direct transient wave by the left ear. A portion of that sound wave also travels through the acoustical passageway in the headset around the head to the right ear, where it is heard comparatively out of phase and decreased in intensity. Sound from the right radiator, in a similar manner, is heard directly by the right ear, then by the left ear comparatively out of phase and decreased in intensity. Finally both ears hear sound that has been reflected randomly within the air space as reverberant sound. Therefore, a stereophonic program heard through the instant headset includes all three basic components necessary for distinguishing direction, distance and spatial quality as discussed previously, namely, intensity differences, phase differences, and reflection-reverberation patterns. Because of this, the listener hears sound from stereophonic recordings or stereophonic radio that more closely approximates the sound that would be heard listening to a live performance. This added realism adds much to the enjoyment of listening to stereophonic programs through the instant headset. Thus, a problem solved by this invention is that the user experiences audibly a more realistic and, therefore, a more enjoyable stereophonic program than available to him with previous headsets.

The present invention more specifically relates to a quadraphonic headset with an ear to ear acoustical passageway, controlled by an inhibiting mechanism to channel and mix a sound source to each ear. Either or both of an inhibiting vane control and/or an inhibiting chamber (partitioned enclosure) in the headset is contemplated. The inhibiting vane control presents the ability to adjust, by degree, the mixing of direct to ambient sound sources. The inhibitor chamber effects front to rear pickup isolation as to quadraphonic reception, resulting in greater separation of sound sources and improved binaural localization, all modes.

The function of the inhibitor vanes, which are mechanical devices, is to mix various ratios of direct to ambient reflected sound. The reason this is accomplished is that actual listening conditions, in which there are fixed amounts of direct to reflected sound as per the recording environment, are simulated. In addition, the pivoting inhibitor vanes of the isolation chambers isolates channel co-interference as to reverberation and reflectance in quadraphonic reception, isolating each channel. This lets each ear hear what is transmitted directly from each speaker, or limits the amount fed to the acoustic channel to balance feeds. The function of the isolation chambers, which are mechanical and rotating, arises because in quadraphonic and/or discrete sound sources, it is necessary to isolate all channels as to direction of source, amplitude variations, and phase and time differences of arrival.

In addition, a third speaker may be introduced into the center of the acoustic passage to reproduce, by way of electrically phased networks, signals which would normally appear as ambient reverberant sounds in a concert environment. Thus the function of the third (center) speaker is to restore inherent ambience. The reason for this is that in most recorded and live performances, there is a certain amount of hidden ambience present in phased and time delay material, undetected in present dual discrete headphone systems. This third active speaker element detects, extracts, and presents this information via differentially phased electrical networks employed in this design. The phasing networks have a function of psychoacoustic effects and enhancement. The reason for the networks is that in order to recreate psychoacoustic effects normally inherent in the recording environment, certain phase adjustments, combination tones, and partial or harmonic reinforcements must be reintroduced electrically to approximate actual listening conditions lost through the effect of masking. These networks thus contribute to the enhancement of original program material.

The present invention, in summary, entails in a preferred embodiment the combination of a stereo headset having an acoustic passage and terminal earphones at each end of the headset. The headset is mountable on the head of a human so that the acoustical device provides for the reception of sound by the human. The terminal earphone at each end of the headset is disposable over an ear of the human. The acoustic passage is hollow and extends from one side of the headset to the other side, so that sound emanating from one terminal earphone is channeled from one ear of the human to the other ear, and so that sound emanating from the other terminal earphone is channeled from the other ear of the human to the one ear. A first mechanical sound inhibitor is disposed in the acoustic passage, so that various ratios of direct sound to ambient sound reflected through the acoustic passage may be mixed and received in an ear of the human as a mixed sound. Means to emit sound are disposed, preferably centrally, in the acoustic passage. A second mechanical sound inhibitor is disposed in each end of the headset within each of the terminal earphones, so that sound emanating from the terminal earphones may be varied in amplitude.

The present invention provides several salient advantages. The invention improves listening to recorded or broadcast music either quadraphonically or stereophonically by enhancing the natural ability of the human ears to locate and preceive azimuthly the recorded material as originally set up in the recording studio. It also reduces the effect of masking and hollowness associated with the prior art of the headphones design. With the acoustic path in the present invention, sounds are routed by allowing amounts of blending between direct and ambient sound to arrive at each opposite ear, with the result that the diffracted waves are delayed in time and phase a fraction of a second later, allowing the natural ability of the ear to perceive the direction of the sound in azimuth situated outside the head of the listener. The acoustic channel in the present invention eliminates the prior art problems by feeding information from the sound source via the channels in phase, time and intensity of varying degrees, sharpening the effect of localization resulting in azimuthal perception; sharper transients and absence of masking (suppression of high frequency by low frequency predominance). Consequently, higher harmonic content is attained, moving sound sources ordinarily in the median plane out of the median plan and into their circumnaural locations as originally recorded or broadcast. Thus in summary, reception of state of the art quadraphonic and stereophonic systems is greatly enhanced in all modes. There is an ability to adjust, by degree, the mixing of direct to ambient sound sources, due to the inhibiting vane control. The inhibiting chamber (partitioned enclosure) effects front to rear pickup isolation as to quadraphonic reception, resulting in greater separation of sound sources and improved binaural localization for all modes. The third (center) speaker effects phasing control for a variety of psychoacoustic phenomena in azimuth. In general, the acoustic passage effects time of arrival by delay diffraction aiding in improving localization and harmonic reinforcement, contributing to the natural ability of the ears to perceive binaural reception and ambience present in the original source. One of the effects of feeding sound via the acoustic path passageway results in additive partials and harmonics, which are ordinarily masked by fundamental frequencies. A byproduct of the aforementioned results in elimination of masking effects, noise impulses, "middle of the head" cancellation.

The invention accordingly consists in the features of construction, combination of elements and arrangement of parts which will be exemplified in the acoustical device hereinafter described and of which the scope of application will be indicated in the appended claims.

BRIEF DESCRIPTION OF THE DRAWINGS

In the accompanying drawings in which are shown several of the various possible embodiments of the invention:

FIG. 7 is a sectional elevation view taken substantially along the line 7—7 of FIG. 6;

FIG. 8 is a plan view of an earphone in accordance with the present invention;

FIG. 9 is a sectional elevation view taken substantially along the line 9—9 of FIG. 8 and showing a telescoping connection between elements of the acoustic channel;

FIG. 10 is a sectional elevation view taken substantially along the line 10—10 of FIG. 8;

FIG. 11 is a perspective view of an alternative embodiment of the present stereo headset;

FIG. 12 is a sectional elevation view taken substantially along the line 12—12 of FIG. 11;

FIG. 13 is a sectional elevation view taken substantially along the line 13—13 of FIG. 12;

FIG. 14 is a perspective view showing still another alternative embodiment of stereo headset in accordance with the present invention;

FIG. 15 is a sectional elevation view taken substantially along the line 15—15 of FIG. 14;

FIG. 16 is a bottom plan view taken substantially along the line 16—16 of FIG. 15; and FIGS. 17-20 inclusive are schematic wiring diagrams of the electrical circuits of the invention.

DETAILED DESCRIPTION OF THE PREFERRED EMBODIMENTS

Figure 1:
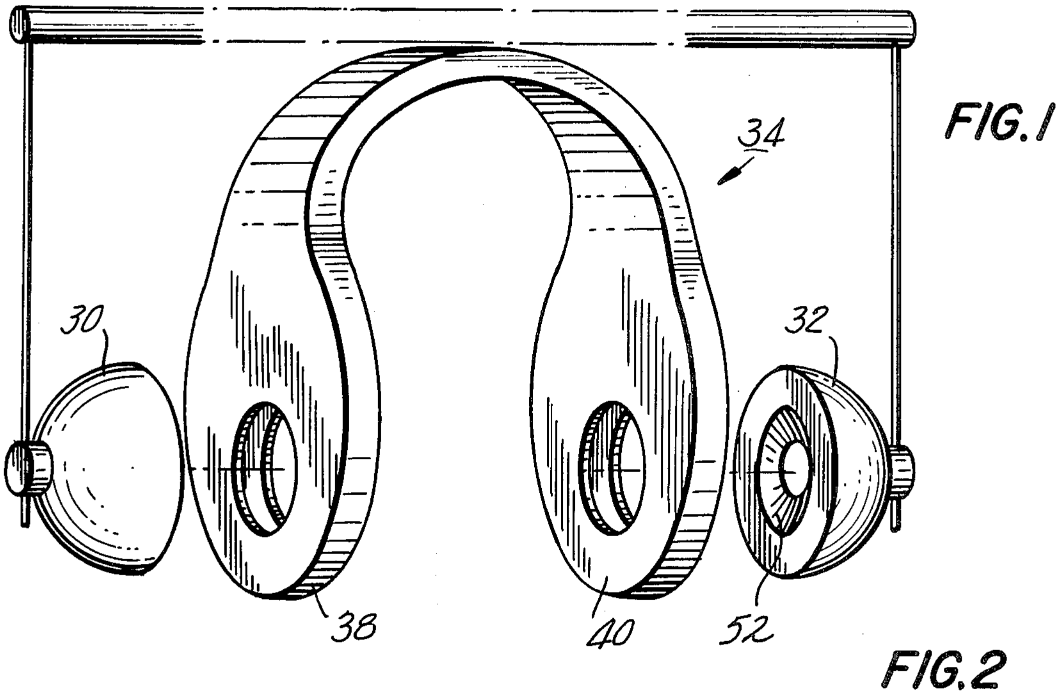
FIG. 1 is an exploded perspective view of a typical stereo headset.
Figure 2:
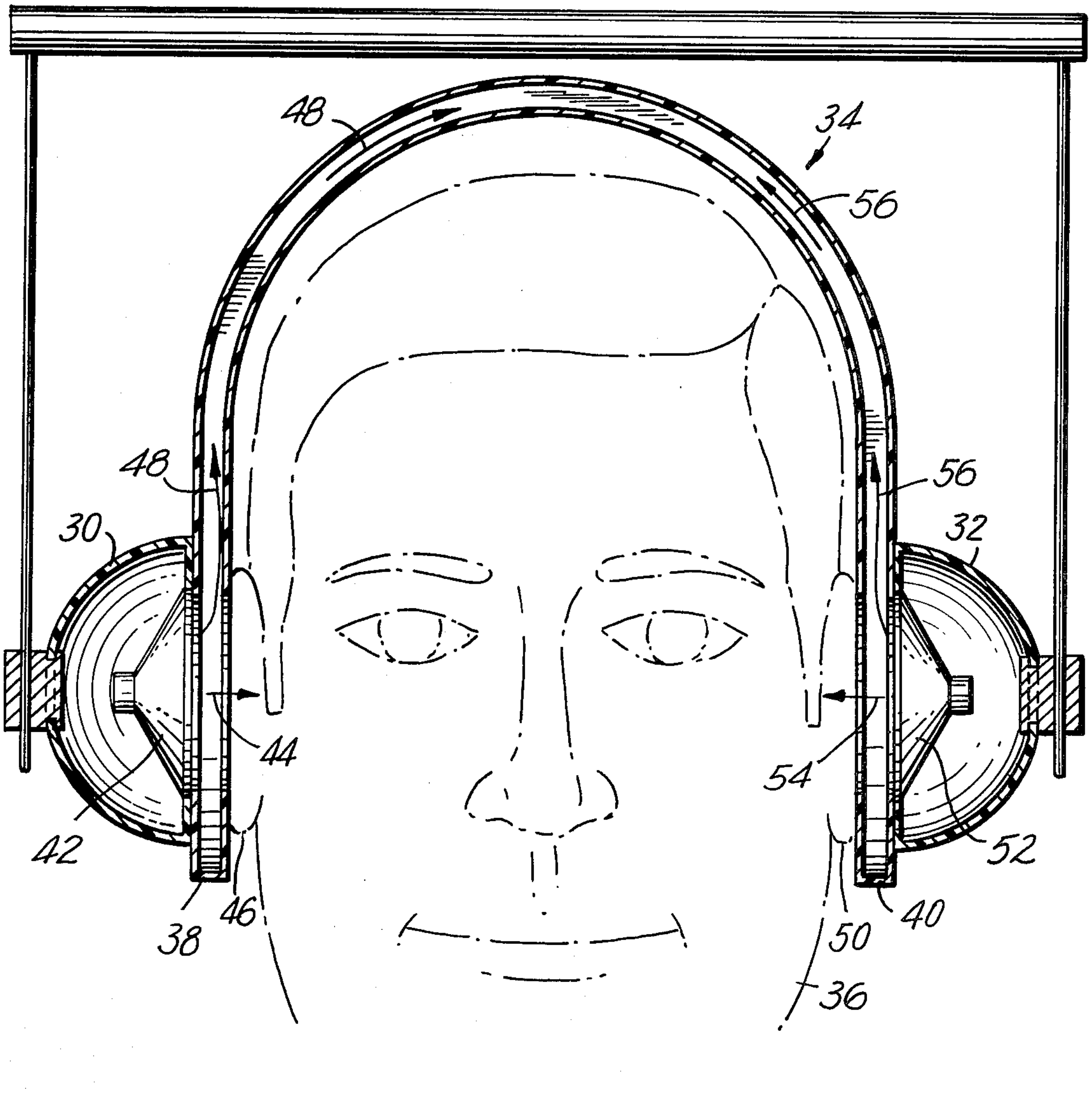
FIG. 2 shows the headset of FIG. 1 emplaced on the head of a human, in sectional elevation view.

Referring now to FIGS. 1 and 2, a stereo headset has two cup-shaped earphones 30 and 32 and a hollow acoustic passage member 34 which extends between the earphones 30 and 32 over the human head 36, shown in phantom outline. The earphones 30, 32 are mounted on the terminal ends 38, 40 respectively of the generally U-shaped hollow acoustic passage member 34. Sound emanating from speaker 42 disposed in right earphone 30 passes directly as indicated by arrow 44 into right ear 46 of the human head 36, and sound also passes from speaker 42 as indicated by arrows 48 from speaker 42 upwards through the acoustic passage member 34 and towards the left ear 50 of the human head 36. Sound emanating from speaker 52 disposed in left earphone 32 passes directly as indicated by arrow 54 into left ear 50 of the human head 36, and sound also passes from speaker 52 as indicated by arrows 56 from speaker 52 upwards through the acoustic passage member 34 and towards the right ear 46. Thus the sounds as indicated by arrows 48 and 56 intermingle in the acoustic passage 34, and the blend of sounds provides a stereo effect of sound to the ears 46 and 50 so that the mind of the listening human head 36 hears a stereo effect of sound. The customary electrical circuit and connections known to those skilled in the art, not shown, are provided for the speakers 42 and 52.

Figure 3:
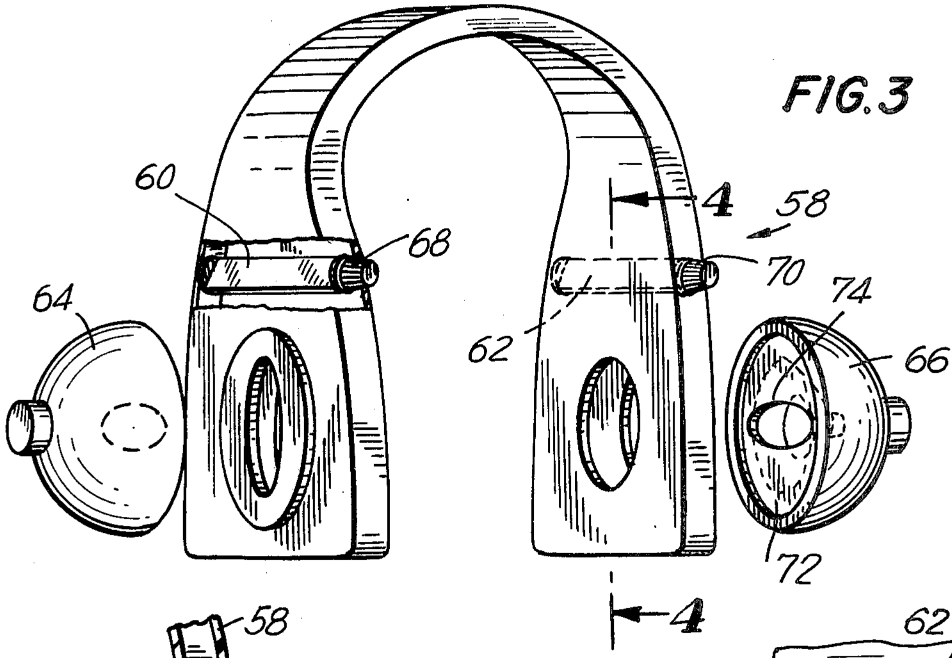
FIG. 3 is an exploded perspective view of one embodiment of headset in accordance with the present invention and showing orienting vanes and aperture controls.
Figure 4:
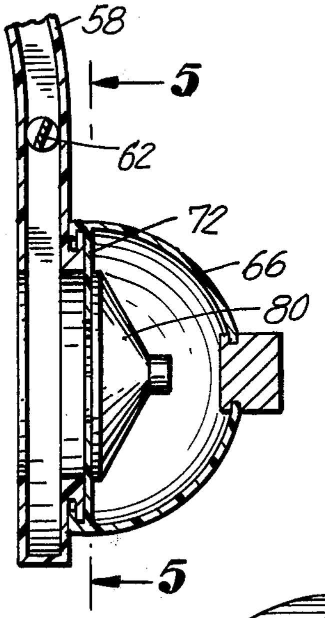
FIG. 4 is a sectional elevation view taken substantially along the line 4—4 of FIG. 3.
Figure 5:
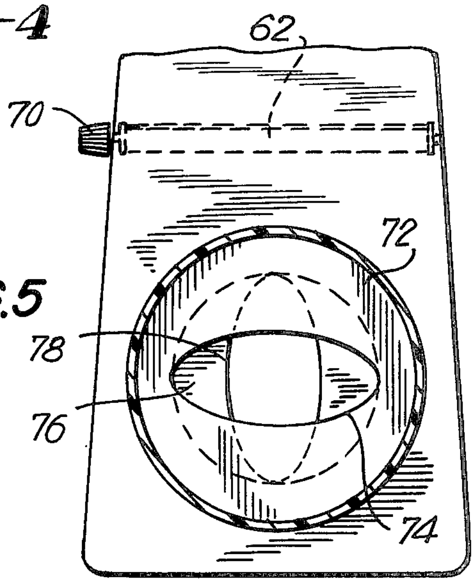
FIG. 5 is an elevation view taken substantially along the line 5—5 of FIG. 4 and showing details of the aperture control in this embodiment of the invention.

Referring now to FIGS. 3, 4 and 5, a stereo headset modified in accordance with the present invention is shown. The acoustic passage member 58 is provided with orienting vanes 60 and 62 in the vertical sections of member 58 above earphones 64 and 66 respectively. The vanes 60 and 62 constitute mechanical sound inhibitors disposed in the acoustic passage member 58, so that various ratios of direct sound to ambient sound reflected through the acoustic passage 58 may be mixed and received in the ears of a human listener as a mixed sound; each of the ears being juxtaposed adjacent to one of the earphones 64 or 66. The orienting vanes 60 and 62 are controlled and adjusted to different settings or angles of inclination, so as to adjust the amount of sound allowed to pass through the acoustic passage 58, by respective attenuator knobs 68 and 70 external to the acoustic passage, and thus the vanes 60 and 62 are manually pivotable and rotatable about a central horizontal axis.

FIGS. 3 and 5 also show details of an aperture control valving as applied to the earphones. The aperture control baffle 72 having a central elliptical or oval opening 74 is rotatable about a central horizontal axis and cooperates with a juxtaposed parallel baffle 76 (FIG. 5) which also has a central elliptical opening 78, so as to modify the amount of sound emanating from speaker 80 which reaches the proximate ear of the listener and also to modify the amount of sound which passes into acoustic passage 58. As shown in FIG. 5, a minimum amount of sound is allowed to pass from speaker 80 while rotation of baffle 72 by 90 degrees will allow a maximum amount of sound to pass through.

Figure 6:
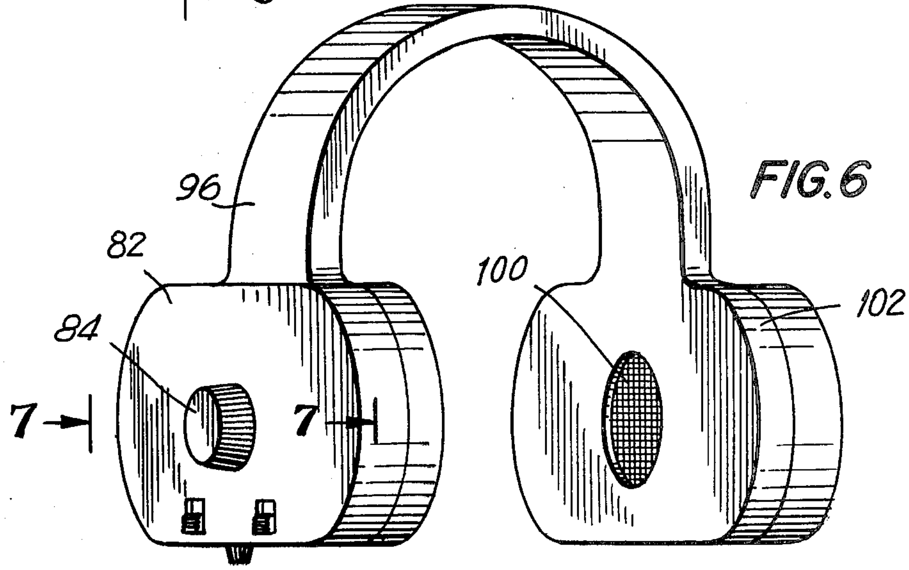
FIG. 6 is a perspective view of an alternative embodiment of the headset of the present invention.

Referring now to FIGS. 6 and 7, an alternative and preferred form of aperture control is shown. As best shown in FIG. 7, a mechanical sound inhibitor is disposed in the end of the headset within the terminal earphone 82, so that sound emanating from the earphone 82 may be varied in amplitude by manual setting or adjustment of attenuator knob 84. The knob 84 is oriented on the central horizontal longitudinal axle or axis 86 of the four-vane mechanical sound inhibitor 88, and rotation of the knob 84 rotates the vanes 88 to different orientations relative to the sound chamber in the earphone. One such change in orientation is shown in phantom outline in FIG. 7. Thus the amount of sound 90 emanating from speakers 92, 94 which reaches the acoustic passage 96 is modulated. In addition, the amount of direct sound reaching the juxtaposed ear through mesh or cloth coverings 98 and 100 on the sound outlets of the respective earphones 82 and 102 is also modulated. As best shown in FIG. 7, each control vane 88 extends radially from the central longitudinal axle 86, and as mentioned supra the axle 86 is at least partially rotatable by manipulation, i.e. rotation of the knob 84. Also as shown in FIG. 7, the mechanical sound inhibitor consisting of vanes 88 is centrally located in its respective earphone 82, and the two speakers 92 and 94 constituting a plurality of means to emit sound are laterally disposed in the earphone 82 adjacent to the vanes 88. The terminal edges of the opposed vertically oriented pair of vanes 88 are contiguous with the respective walls 104, 106 of the earphone 82.

FIGS. 8, 9 and 10 show an embodiment of the invention in which speakers 108 and 110, shown in phantom outline, are disposed laterally on either side of a central mechanical sound inhibitor consisting of vanes 112, which vanes 112 are mounted on a central longitudinal axle or axis 114 which is manually rotated by attenuator knob 116 in a manner similar to that described supra with regard to FIGS. 6 and 7, so that the vanes 112 act as an aperture control to modulate sound emission from speakers 108 and 110 to acoustic passage 118 via arrows 120 as shown in FIG. 10. FIG. 9 shows a telescoping sliding joint 122 between acoustic passage members 118 and 124 which is provided to accommodate for different sized and shaped heads of the listener to the stereo sound. Thus a sliding adjustable headband is provided with the acoustical channel or passage members 118 and 124.

FIGS. 11, 12 and 13 show a preferred three-vane configuration for the mechanical sound inhibitors disposed in earphones 126 and 128, as well as two lateral telescoping joints 130 and 132 for the adjustable headband 134 of the acoustical channel or passage. Thus three vanes 136, 138 and 140 are centrally mounted on horizontal longitudinal axle or axis 142 which is controlled by attenuator knob 144. Lateral speakers 146 and 148 and central wire mesh or cloth sound outlet 150 are provided in earphone 128, while an annular circular layer of padding 152 (FIG. 13) about sound outlet 150 provides for comfortable mounting of the earphone on and about the ear of the listener to the stereo sound. Attenuator knob 154 may be provided to control the volume of sound emanating from one or both of the speakers 146, 148 in a manner known to those skilled in the art. Likewise switches 156 and 158 may individually control the electrical signal to or the sound emission from the respective speaker 146 and 148 in a manner known to those skilled in the art.

FIGS. 14, 15 and 16 show an embodiment of the invention in which an auxiliary speaker 160 is centrally mounted in acoustic channel or passage 162 equidistant from the terminal earphones 164 and 166. The speaker 160 constitutes a means to emit sound disposed in the acoustic passage 162, and in this preferred embodiment speaker 160 is centrally disposed in the acoustic passage 162 equidistant from the terminal earphones 164, 166 of the headset. Also show in FIGS. 14, 15 and 16 is an orienting or inhibitor vane 168 controlled by attenuator knob 170 and mounted in acoustic passage 162, as well as circular padding 172 at earphone 164. The vane 168 controls and modulates the sound (arrows 174) passing from the speaker of earphone 164 upwards through the acoustic channel 162 so that a modulated sound (arrow 176) is allowed to flow into the passage 162.

FIG. 17 is a schematic wiring diagram for four channel quadraphonic and two channel enhanced stereo. The respective speakers 178, 180, 182 and 184 are, respectively, left front, left rear, right front and right rear. Switches and wiring are shown. FIG. 18 is a schematic wiring diagram for enhanced stereo, 2 channel. The speakers 186, 188, 190 and 192 are as in FIG. 17. FIG. 19 is a schematic wiring diagram for quadraphonic four channel stereo. The speakers, indicated by circles, are as before. FIGS. 17, 18 and 19 apply generally to the FIGS. 7, 8, and 12 embodiments of the invention. FIG. 20 is a schematic wiring diagram of enhanced stereo with a three-speaker system, applicable to the FIG. 14 embodiment of the invention. Speaker 194 is the top center speaker corresponding to the speaker 160 of FIGS. 14, 15 and 16, while the other speakers 196 and 198 are in the respective earphone.

It thus will be seen that there is provided an acoustical device which achieves the various objects of the invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. An acoustical device for the reception of sound by humans which comprises a stereo headset having an acoustic passage, and a terminal earphone at each end of said headset, each of said terminal earphones including a first means to emit sound into said acoustic passage, said headset being mountable on the head of a human so that the terminal earphone at each end of said headset is disposable over an ear of a human, said acoustic passage being a continuous hollow passage and extending from one side of said headset to the other side, so that sound emanating from one terminal earphone is channeled from one ear of a human to the other ear, and so that sound emanating from the other terminal earphone is channeled from the other ear of a human to the one ear, an adjustable mechanical sound inhibitor disposed in said acoustic passage, so that various ratios of direct sound to ambient sound reflected through said acoustic passage may be mixed and received in an ear of a human as a mixed sound, said mechanical sound inhibitor permitting at least partial channeling of sound between the ears, and a second means to emit sound into said acoustic passage, said second means to emit sound being disposed in said acoustic passage.

2. The acoustical device of claim 1 in which the mechanical sound inhibitor comprises at least one vane disposed in the acoustic passage.

3. The acoustical device of claim 2 in which the vane is at least partially rotatable about a longitudinal axis.

4. The acoustical device of claim 1 in which the second means to emit sound is centrally disposed in the acoustic passage equidistant from the terminal earphones of the headset.

5. The acoustical device of claim 1 in which an adjustable mechanical sound inhibitor is disposed in each end of the headset within each of the terminal earphones, so that sound emanating from the terminal earphones may be varied in amplitude.

6. The acoustical device of claim 5 in which each end mechanical sound inhibitor comprises at least one vane disposed in the respective earphone.

7. The acoustical device of claim 6 in which a plurality of vanes is provided, each vane extending radially from a central longitudinal axle, together with means to at least partially rotate said axle.

8. The acoustical device of claim 7 in which the number of vanes is three.

9. The acoustical device of claim 5 in which each mechanical sound inhibitor is centrally located in its respective earphone, and a plurality of means to emit sound are laterally disposed in said respective earphone adjacent to the mechanical sound inhibitor.

10. The acoustical device of claim 9 in which each mechanical sound inhibitor comprises a plurality of vanes, each vane extending radially from a central longitudinal axle, the terminal edge of at least one of said vanes being contiguous with a wall of the earphone, together with means to at least partially rotate said axle.

11. The acoustical device of claim 10 in which the number of vanes is three.

12. An acoustical device for the reception of sound by humans which comprises a stereo headset having an acoustic passage and a terminal earphone at each end of said headset, each of said terminal earphones including a first means to emit sound into said acoustic passage, said headset being mountable on the head of a human so that the terminal earphone at each end of said headset is disposable over an ear of a human, said acoustic passage being a continuous hollow passage and extending from one side of said headset to the other side, so that sound emanating from one terminal earphone is channeled from one ear of a human to the other ear, and so that sound emanating from the other terminal earphone is channeled from the other ear of a human to the one ear, and a second means to emit sound into the acoustic passage, said second means to emit sound being disposed in the acoustic passage.

13. The acoustical device of claim 12 in which the second means to emit sound is centrally disposed in the acoustic passage equidistant from the terminal earphones of the headset.

14. An acoustical device for the reception of sound by humans which comprises a stereo headset having an acoustic passage and a terminal earphone at each end of said headset, each of said terminal earphones includng means to emit sound into said acoustic passage, said headset being mountable on the head of a human so that the terminal earphone at each end of said headset is disposable over an ear of a human, said acoustic passage being a continuous hollow passage and extending from one side of said headset to the other side, so that sound emanating from one terminal earphone is channeled from one ear of a human to the other ear, and so that sound emanating from the other terminal earphone is channeled from the other ear of a human to the one ear, and an adjustable mechanical sound inhibitor disposed in each end of the headset within each of the terminal earphones, so that sound emanating from the terminal earphones may be varied in amplitude.

15. The acoustical device of claim 14 in which each mechanical sound inhibitor comprises at least one vane disposed in the respective earphone.

16. The acoustical device of claim 15 in which a plurality of vanes is provided, each vane extending radially from a central longitudinal axle, together with means to at least partially rotate said axle.

17. The acoustical device of claim 16 in which the number of vanes is three.

18. The acoustical device of claim 14 in which each mechanical sound inhibitor is centrally located in its respective earphone, and a plurality of means to emit sound are laterally disposed in said respective earphone adjacent to the mechanical sound inhibitor.

19. The acoustical device of claim 18 in which each mechanical sound inhibitor comprises a plurality of vanes, each vane extending radially from a central longitudinal axle, means to at least partially rotate said axle, the outer terminal edge of at least one of said vanes being contiguous with a wall of the earphone.

20. The acoustical device of claim 19 in which the number of vanes is three.

21. An acoustical device for the reception of sound by humans which comprises a stereo headset having an acoustic passage and terminal earphones at each end of said headset, said headset being mountable on the head of a human so that the terminal earphone at each end of said headset is disposable over an ear of a human, said acoustic passage being a continuous hollow passage and extending from one side of said headset to the other side, so that sound emanating from one terminal earphone is channeled from one ear of a human to the other ear, and so that sound emanating from the other terminal earphone is channeled from the other ear of a human to the one ear, a first adjustable mechanical sound inhibitor disposed in said acoustic passage, so that various ratios of direct sound to ambient sound reflected through said acoustic passage may be mixed and received in an ear of a human as a mixed sound, means to emit sound into said acoustic passage disposed in the acoustic passage, and a second adjustable mechanical sound inhibitor disposed in each end of the headset within each of the terminal earphones, so that sound emanating from the terminal earphones may be varied in amplitude.

22. The acoustical device of claim 21 in which each second mechanical sound inhibitor is centrally located in its respective earphone, and a plurality of means to emit sound are laterally disposed in said respective earphone adjacent to the mechanical sound inhibitor.

* * * * *